Dec. 16, 1924.  
A. F. ZAHM  
ACCELEROMETER  
Filed June 29, 1921  
1,519,473  
5 Sheets-Sheet 1

Inventor  
A. F. Zahm  
By Robt. H. Young.  
Attorney

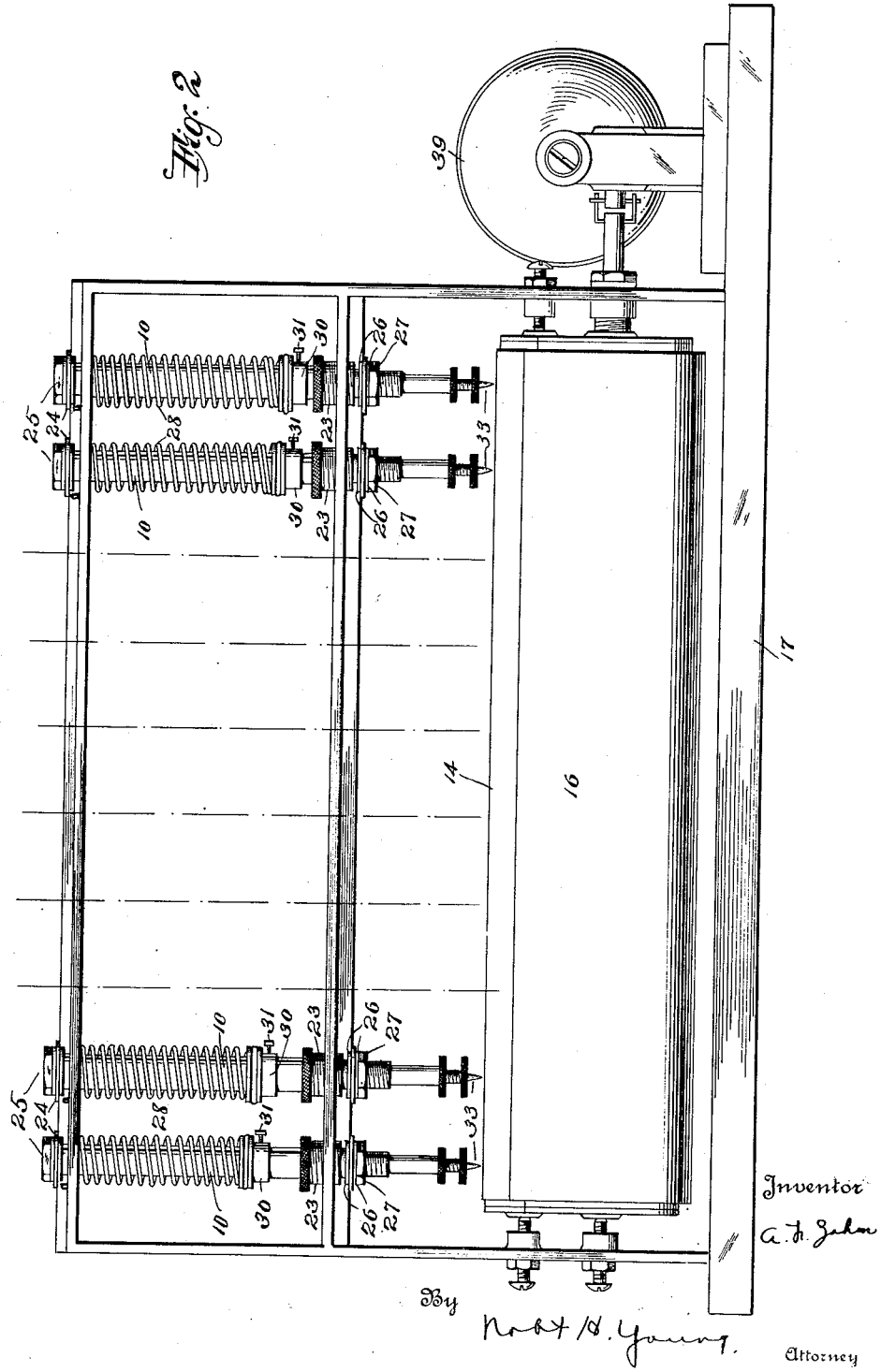

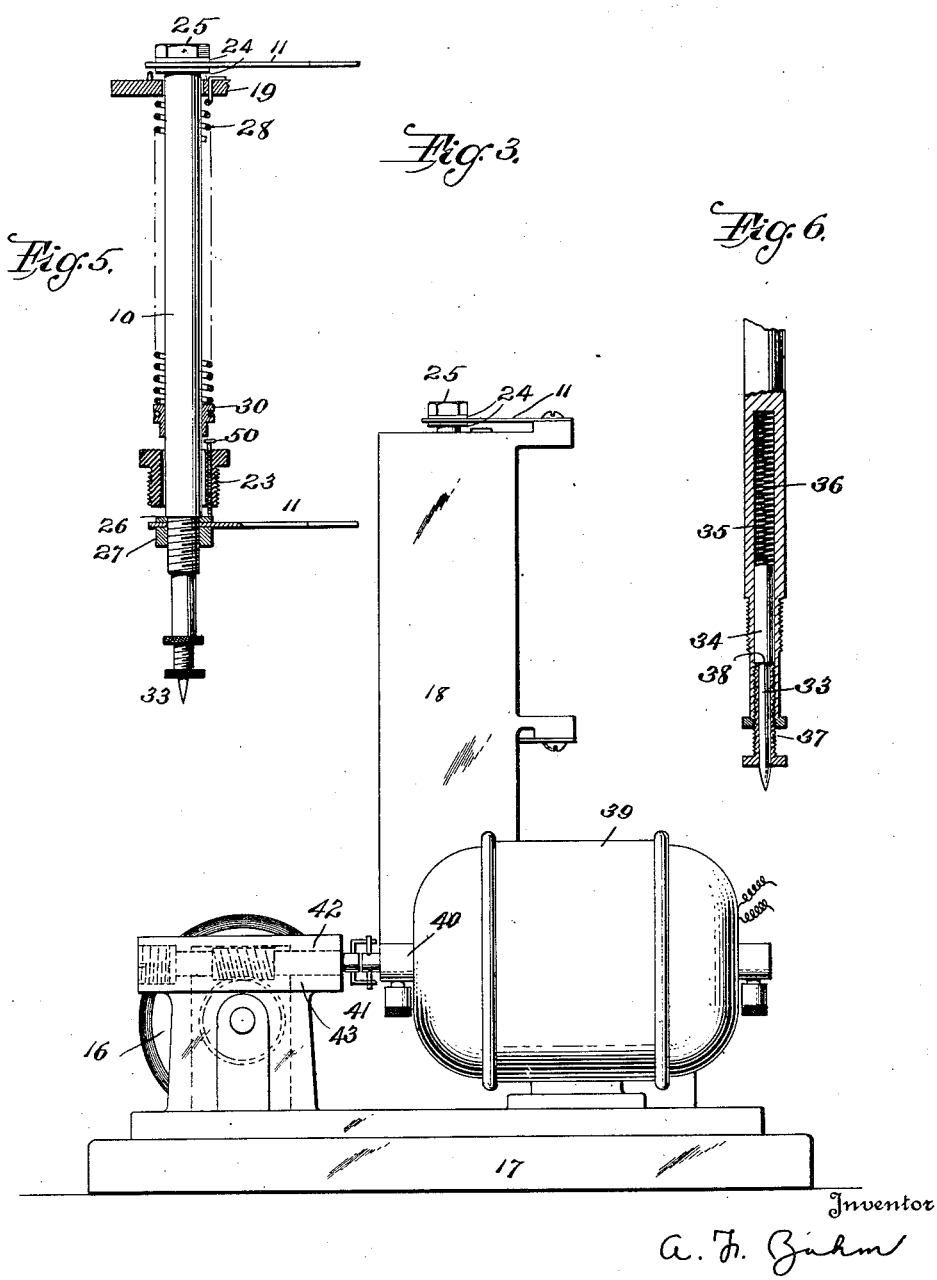

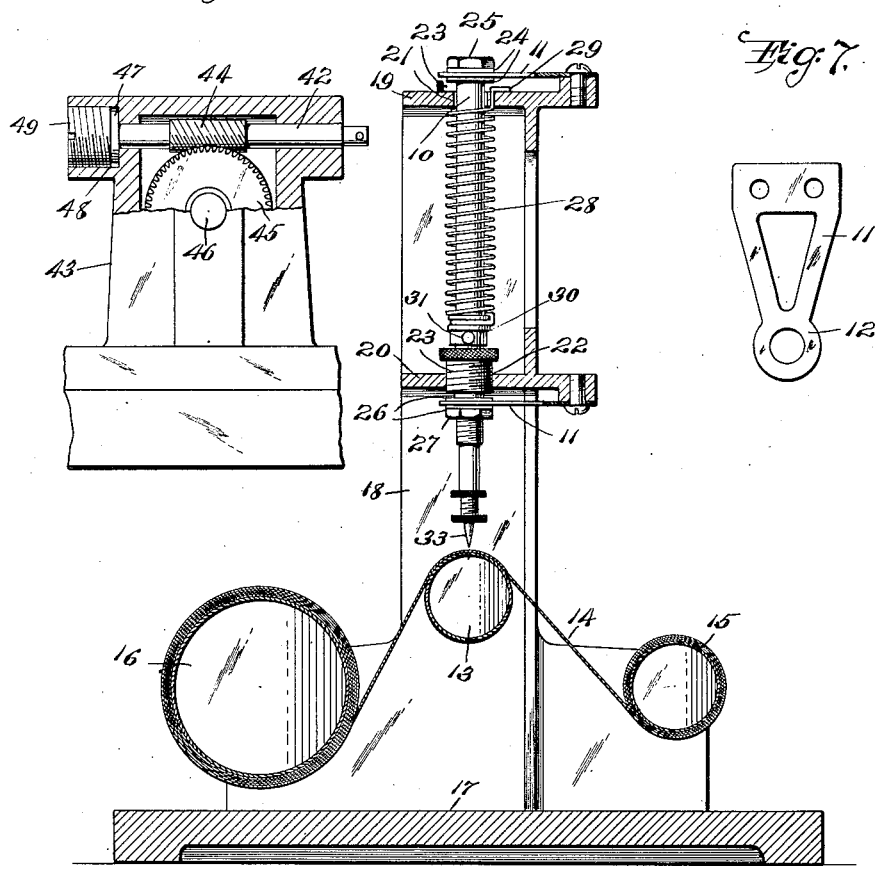

Dec. 16, 1924.

A. F. ZAHM

ACCELEROMETER

Filed June 29, 1921

Patented Dec. 16, 1924.

1,519,473

UNITED STATES PATENT OFFICE.

ALBERT F. ZAHM, OF WASHINGTON, DISTRICT OF COLUMBIA.

ACCELEROMETER.

Application filed June 29, 1921. Serial No. 481,380.

*To all whom it may concern:*

Be it known that I, ALBERT F. ZAHM, a citizen of the United States, residing at Washington, District of Columbia, have invented certain new and useful Improvements in Accelerometers, of which the following is a specification.

My invention relates to accelerometers, the device hereinafter described and shown being especially designed for use on aircraft and especially airplanes. It will be apparent, however, as the description proceeds that the accelerometer may be used in many other connections, and in fact wherever it is desired or necessary to measure the sudden loads and shocks encountered by a moving mass. In the present embodiment of the invention the device is particularly adapted for measuring the sudden loads and shocks encountered in flying and in landing, whether upon land or water.

A further object of the invention, and one of the most important objects thereof, is to provide a device of the character above referred to whose records may be easily and directly read or observed.

Another object in view is to provide an instrument of the class specified which may be adjusted or calibrated so as to adapt the instrument particularly for the immediate work to be performed thereby, or in other words to record, register or indicate shocks or vibrations of greater or less intensity in accordance with the nature or character of the experiments being conducted and the size or weight of the aircraft or other machine upon which the accelerometer is mounted and which is to be subjected to shocks or loads.

In the accompanying drawings:—

Figure 2 is a side elevation of the same.

Figure 3 is an end view thereof.

Figure 4 is a vertical transverse section through the instrument taken approximately in line with one movable mass or stylus.

Figure 5 is a side elevation of one of the movable masses or styli, showing the guiding and supporting means thereof partly in section.

Figure 6 is a fragmentary longitudinal section through one of the moving masses or styli.

Figure 7 is a plan view of one of the cantilever springs for the support of a movable mass or stylus.

Figure 8 is a fragmentary sectional view showing a portion of the transmission means between the motor and the record sheet.

Figure 1:
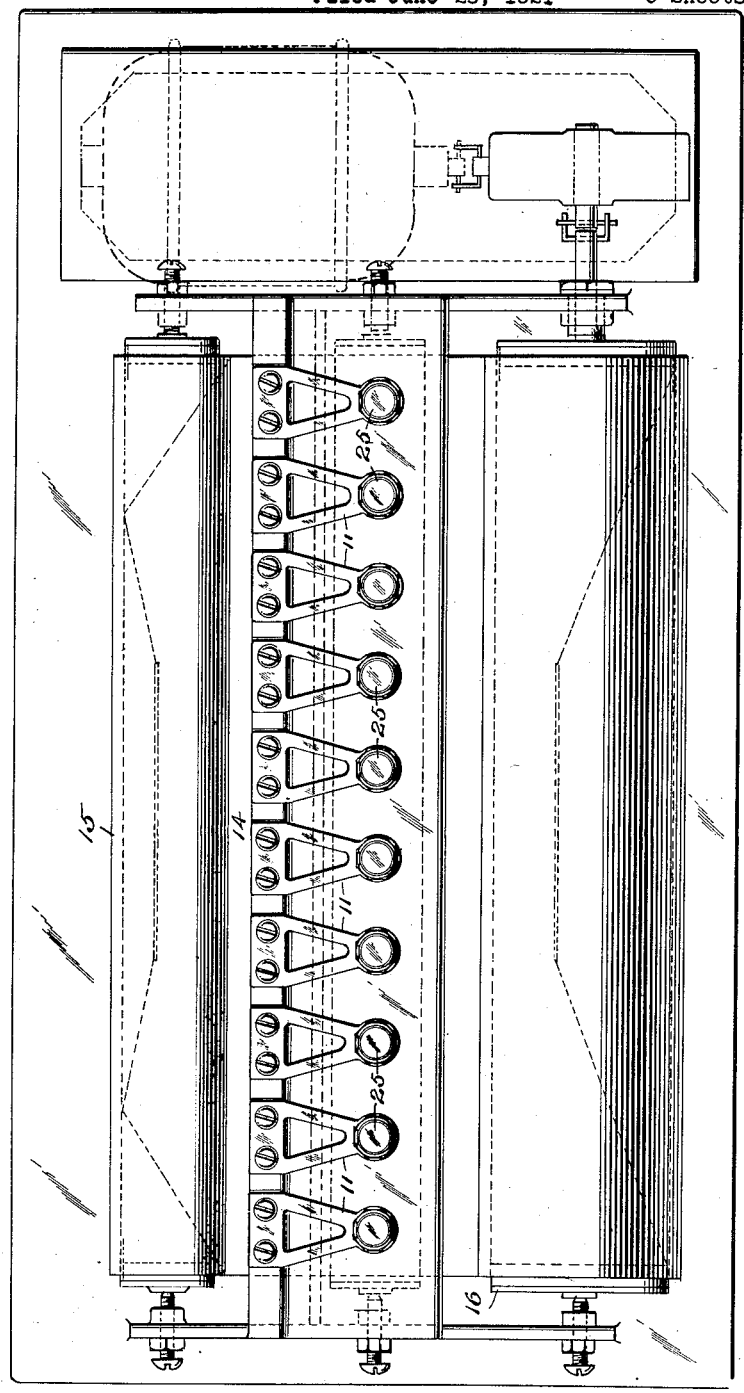
Figure 1 is a plan view of the accelerometer.

The instrument which has been developed embodies a plurality of movable masses 10, each of which is shown in the form of a stylus or pointed rod arranged by preference vertically, and movable in a substantially rectilinear path. The movable masses or styli are preferably arranged in a single row or series, as illustrated in Figures 1 and 2, and each stylus is supported adjacent to the top thereof and at a point considerably lower down by means of thin cantilever springs 11, the free ends of which are formed with openings 12 through which the respective stylus passes. All of the styli are arranged above a single chronograph drum 13 over which passes a continuous record sheet 14 of sensitized paper. The record sheet 14 is wound upon rollers 15 and 16 mounted in suitable bearings in the frame of the instrument and located on opposite sides of the drum 13, as best illustrated in Figure 4, one of said rollers being a delivery roller and the other a receiving roller which is driven by a motor hereinafter referred to, the record sheet 14 being driven at a predetermined speed so as to properly and accurately record the accelerations of different intensities.

The frame may be of any suitable construction, being shown as comprising a base 17, end uprights 18, an upper horizontal bar or frame member 19 and a lower frame bar or member 20 parallel to the member 19. The frame member 19 is formed with a series of openings 21 for the styli and the lower frame member 20 is formed with a corresponding series of openings 22 for the same purpose. A threaded nipple or bearing guide 23 for each stylus is adjustably screwed through the respective opening 22 in the lower frame member 20, the stylus being slidable therethrough.

The upper spring 11 fits between collars or washers 24 on the adjacent stylus 10 and beneath a head or nut 25 at the upper extremity of the stylus. In like manner the lower spring 11 fits between collars or washers 26 on the stylus 10, the same being located above a nut 27 threaded on the stylus. By the means described, each stylus may be adjusted so as to bring the scribing point thereof to the proper distance from the record sheet 14. In connection with each stylus I employ resistance means 28 conveniently in the form of a helical spring coiled around the stylus and having one extremity 29 secured to the frame, the other extremity of the resistance spring being attached to a clip on a collar 30 adjustable longitudinally of the stylus by means of a set-screw 31. The movement of the stylus toward the record sheet is limited by a stop 32, shown in Figure 5 in the form of an annular rib extending upwardly from the upper frame member 19. The movement of the stylus in the opposite direction is limited by the threaded nipple 23, the bottom of which acts as a stop for the purpose specified.

In order to prevent the stylus from puncturing, tearing or otherwise injuring the record sheet 14, each stylus embodies a pointed plunger or needle 33 having an enlarged portion 34 against the upper end of which presses a cushioning spring 35 housed within a bore 36 in the stylus, as shown in Figure 6. Downward movement of the plunger 33 is limited by an adjustable stop 37 threaded into the lower end of the bore 36 and coacting with a shoulder 38 at the point where the plunger is formed with the enlargement 34. By means of the stop 37 the projection of the plunger 33 may be regulated to bring the point thereof to the desired distance from the drum 13 and record sheet 14, said distance being ordinarily a few thousandths of an inch. The winding roller 16 upon which the record sheet 14 is wound is driven, in the present embodiment of the invention, by a small electric motor 39, the shaft 40 of which is connected by a coupling 41 to a worm shaft 42 journaled in a bearing member 43 on the base 17 of the instrument. The worm 44 of the shaft 42 meshes with and drives a gear 45 on the shaft 46 of the roller 16. To allow for endwise expansion of the shaft 42, the latter is provided at one end with a flange or head 47 which turns in a recess 48 in the bearing member 43 and is held against endwise movement by a plug 49 threaded into the recess 48. In this way a perfect working engagement is maintained between the worm and worm gear. The accelerations to which the styli or movable masses are subjected are measured by the springs or resistance members 28 which are of graded intensity.

Instead of recording the movements of the styli upon a record sheet as above described, the movement of each stylus may be visually indicated by means of electric bulbs on the instrument board of an airplane or other convenient place, and for that purpose an electrical contact 50 may be mounted in the respective nipple or stop 23, as shown in Figure 5, for contact with a movable part of the stylus, it being understood that the contact member 50 may be electrically connected to the respective bulb which therefore displays a light when the particular stylus referred to is subjected to a force sufficient to cause movement thereof.

When acceleration occurs, as when a landing shock is sustained by an airplane, a certain number of styli begin to record instantly, as the intensity of the force overcomes in succession stronger and stronger springs or resistance members 28. When preparing the instrument for any proposed measurement, the springs are set so as to meet any probable accelerations that will have to be recorded. By means of the adjustable collars 30, the force of the springs may be adjusted so as to equal any multiple of the weight of the stylus or movable mass. To this end, forces are applied in succession to each stylus by contact with a weighing scale, such forces being multiples or fractions of the whole fixed weight of the stylus plus half the weight of the resistance 28, while the springs are adjusted so as barely to support the stylus against the respective stop 3. The needle points 33 are of some such material as brass, or German silver, making a clear, fine mark on the chemically treated paper which forms the record sheet. In the position and adjustment shown in the drawings, the instrument in its present embodiment records only upward accelerations, but by inversion can, without further adjustment, record downward accelerations provided account be taken of the reverse direction of gravity. The thin cantilever springs 11 prevent the stylus from rubbing against the guiding means of the frame. The whole structure, including the motor, may be housed within a suitable container or casing. In the instrument herein described and which has been used in actual practice, the record sheet is six feet in length and driven at the rate of two inches per second for such accelerations as are met with in airplane experiments. This rapidity is essential in order to separate and clearly disclose landing shocks and structure vibrations; for it is usually the short hammer-blow shocks of a few hundredths of a second duration which impart the most stress to the under parts of an airplane in effecting a landing, either on land or water.

In action the instrument appears to be fairly instantaneous and free from the oscillations found in a spring accelerometer whose recorder has a considerable displacement. Thus each needle records without interruption a definite continuous acceleration beyond a certain intensity, but instantly ceases recording when the acceleration falls below this amount. It can also simultaneously record long and short accelerations.

For example, engine tremors superposed upon an air swell cause a needle to make a dotted trace; the length of the trace representing the duration of the swell beyond a certain intensity, and the distance between dots representing the period of the engine tremor. In fact, a known engine speed serves to standardize that of the paper, and a known paper speed that of the engine. The aggregate tracings of all the needles form a shaded diagram whose contour is a wavy line like that of a spring accelerometer.

Figure 9:
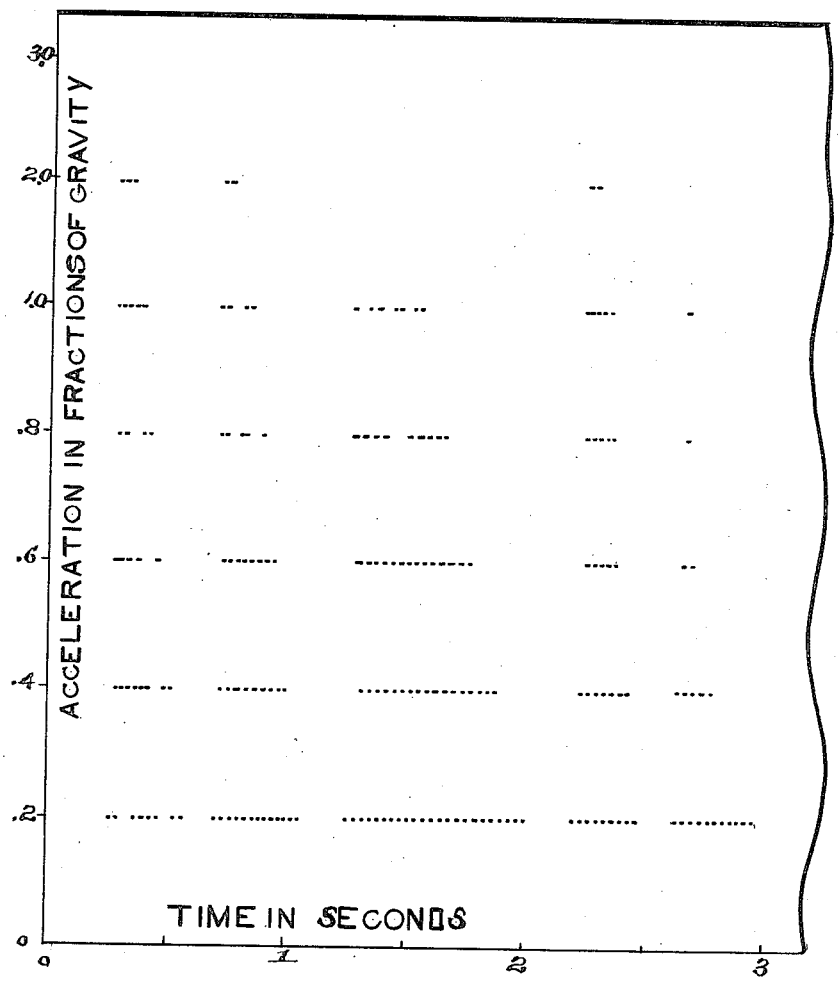

The chart shown in Figure 9, is that described in the landing of the Curtiss JN—4—E plane on pontoons. The accelerometer may be placed within the body of the plane to measure the shock of landing on the whole plane or may be placed on the wings or more than one accelerometer may be used and disposed at various places about the planes, as in the tail section, the wings and the fuselage, in order to determine the proportionate amount of shocks received by the various component parts of the aircraft upon landing or upon striking unusual air currents. The device may be set in operation at any time quite simply by the use of any suitable switch in setting the motor in operation. In the use of accelerometers to determine the vibrations and take off and the landing of the craft, it is to be noted that the comparatively high speed of movement of an aircraft makes it possible to obtain all of this data within a comparatively limited space of time, the landing or take-off in any instance occupying but a few seconds of time. If several accelerometers are used, as above described, it is obvious that considerable data may be obtained which will be useful in determining the necessary strength of the various component parts of the aircraft receiving and bearing these stresses imposed by said shocks.

What is claimed as new is:

1. An accelerometer embodying a movable mass in the form of a plunger, resistance means therefor, and means for regulating the intensity of said resistance to control the amount of force required to effect the initial movement of said mass.

2. An accelerometer embodying a plurality of movable masses of plunger formation, and a resistance for each of said masses, the several resistances differing in intensities.

3. An accelerometer embodying a plurality of movable masses of plunger formation, a resistance for each of said masses, and means for adjusting said resistances to give different intensities.

4. An accelerometer embodying a movable mass in the form of a plunger, resistance means therefor, means for adjusting the intensity of said resistance means and a retractible stylus carried by said mass.

5. An accelerometer embodying a movable mass in the form of a plunger, resistance means therefor, means for adjusting the intensity of said resistance means, a retractible stylus carried by said mass, and recording means in the path of said stylus.

6. An accelerometer embodying a movable mass in the form of a plunger, a resistance therefor, and frictionless supporting means for said mass.

7. An accelerometer embodying a movable mass in the form of a plunger, cantilever supporting means for said mass, and a resistance means for said mass.

In testimony whereof I have affixed my signature.

ALBERT F. ZAHM.